United States Patent [19]
May

[11] Patent Number: 6,000,620
[45] Date of Patent: Dec. 14, 1999

[54] MAGNETIC CARD READER

[75] Inventor: David C. C. May, Fife, United Kingdom

[73] Assignee: NCR Corporation, Dayton, Ohio

[21] Appl. No.: 08/804,647

[22] Filed: Feb. 25, 1997

[30] Foreign Application Priority Data

Aug. 30, 1996 [GB] United Kingdom .................... 9618104

[51] Int. Cl.⁶ .............................. G06K 19/06; G06K 7/08
[52] U.S. Cl. ............................................ 235/493; 235/449
[58] Field of Search ...................................... 235/493, 449

[56] References Cited

U.S. PATENT DOCUMENTS 4,812,632  3/1989  Kakinuma et al. ...................... 235/479
5,388,011  2/1995  Tollum ....................................... 360/46

*Primary Examiner*—Donald Hajec
*Assistant Examiner*—Daniel Sherr
*Attorney, Agent, or Firm*—Gregory A. White

[57] ABSTRACT

A reader (20) for a magnetic card for an automated teller machine (40) or other self-service financial terminal comprises a magnetic reading head (22), a wave shaper (26), and a data memory (28) to supply card-related data to a central authorization position. A wave shape monitor (30) is preset with a threshold amplitude, and detects the amplitude of analogue signals from the wave shaper; if the signals are readable but below the threshold level, the same magnetic reading head (22) or a different magnetic head (34) is instructed to rewrite the magnetic data on the card.

20 Claims, 2 Drawing Sheets

6,000,620

MAGNETIC CARD READER

BACKGROUND OF THE INVENTION

The invention relates to a magnetic card read operated by a card carrying magnetic data. Such data may be authorization data, e.g. for use with a self-service financial terminal such as an automated teller machine (ATM), or may be data on a magnetic stripe 'Smart Card' or electronic purse.

An advantage of such a card is the ease with which magnetic data can be written to the card, usually in a magnetic stripe, but unfortunately the converse is also true, and the data is easy to erase. Such an erasure can occur when the card is placed in close proximity to the magnetic clasp frequently used on handbags and pocket books. The damage may initially be slight, so that the card remains usable, but repeated exposure may cause cumulative damage and eventually the magnetic data will be unreadable. The card will then have to be replaced.

SUMMARY OF THE INVENTION

It is an object of the invention to provide a card reader for a magnetic data card which reduces the number of cards which have to be replaced due to cumulative erasure damage.

According to the invention there is provided a magnetic card reader comprising means to accept a card having magnetically-stored data; magnetic reading means; and means to provide an output signal; characterized by monitoring means to monitor the quality of magnetic data read by the magnetic reading means, and magnetic writing means arranged to rewrite any readable magnetic data which is below a predetermined quality.

BRIEF DESCRIPTION OF THE DRAWINGS

In the accompanying drawings, a know arrangement for a magnetic card reader is shown in FIG. 1 the invention described by way of example only with reference to.

DETAILED DESCRIPTION

Figure 1:
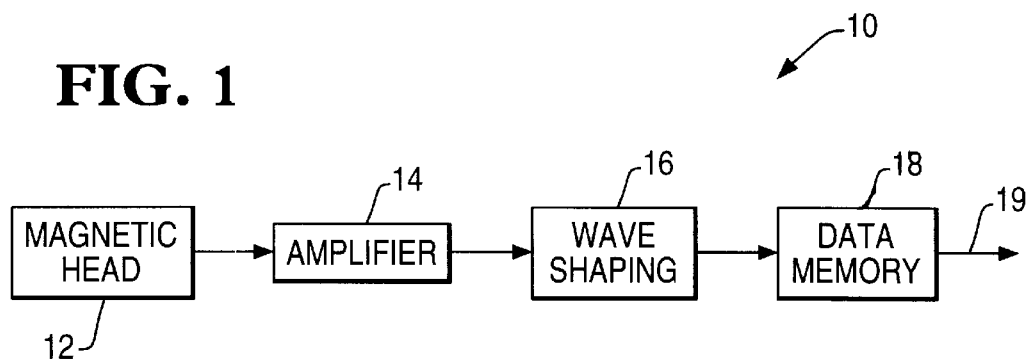

In the prior art system of FIG. 1, a known card reader 10 comprises a magnetic head 12, an amplifier 14, a wave shaping device 16, and a data memory 18 having an output 19 connected, for example, to an ATM central authorization system (not shown). In operation, a card having a magnetic stripe is placed in the reading head of an ATM so as to be adjacent the magnetic head 12. Magnetic data in the stripe on the card is read by the head 12, and a analogue electrical signal is supplied to the amplifier 14 which passes an amplified signal to the wave shaping device 16. The wave shaping device 16 supplies a digitized version of the analogue signal to the data memory 18, which stores it; the stored version is the equivalent of the data stored magnetically in the card.

The signal on the output 19 of the data memory 18 may for example be passed to the central authorization system of an ATM, the signal indicating the identity of the cardholder. The authorization system then provides a return signal authorizing the cardholder to perform a transaction on the ATM, such as a cash withdrawal.

Clearly, if the magnetic data on the card has been damaged, the signal on the output 19 of the data memory 18 will be inadequate to allow authorization of use of the card.

Figure 2:
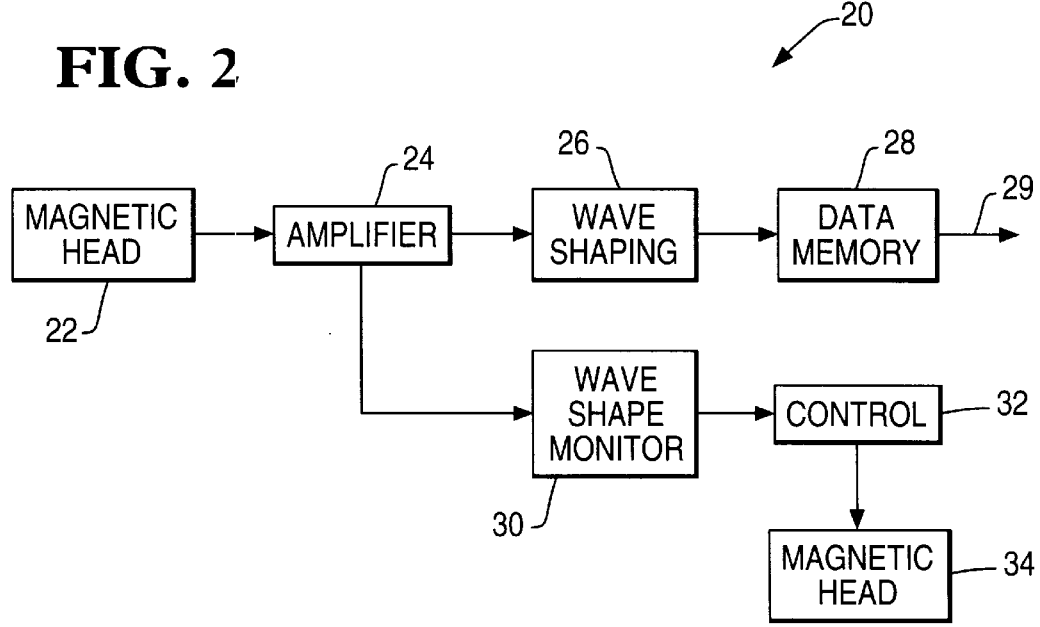
FIG. 2, which illustrates the arrangement of the inventive card reader.

FIG. 2 illustrates a similar system of a card reader 20 having a magnetic head 22, amplifier 24, wave shaping device 26 and data memory 28 having an output 29. In addition, there is provided a wave shape monitor 30 connected to the wave shaping device 26, and a control device 32 connected to a further magnetic head 34, arranged to operate in a magnetic write mode.

Operation is similar to that of the card reader 10, but in addition the amplifier 24 provides an analogue signal to the wave shape monitor 30. The monitor 30 contains a preset threshold level; if the amplitude variation of the analogue signal from the wave shaping device 26 falls below the threshold, the monitor 30 provides a signal to the control 32, which operates the magnetic head 34 to rewrite the magnetic data in the stripe on the card.

In a variation, not shown, the further magnetic head 34 is omitted, and the control 32 is connected to the magnetic head 22, instructing it to operate in a magnetic-write mode to rewrite the data on the card.

Figure 3:
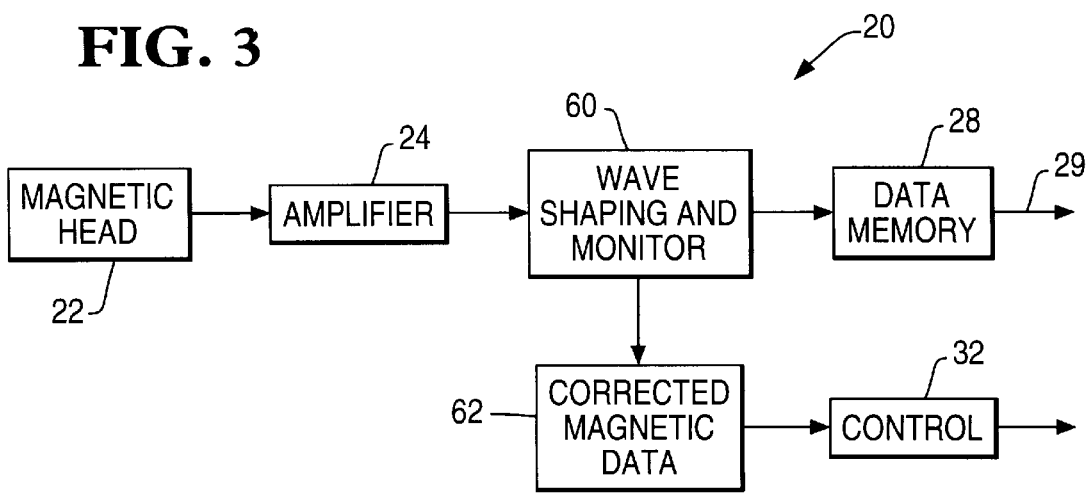
FIG. 3, which illustrates an alternative to the arrangement in FIG. 2.

In FIG. 3, a further variation is shown in which a card reader 20' has a magnetic head 22, an amplifier 24, a data memory 28 and a control device 32 to control a magnetic write operation. In the variation, the wave shaping and monitoring are performed in a single digital signal processor 60, which provides an output 62 consisting of corrected magnetic data, which is supplied to the control device 32 to rewrite the magnetic data on the card stripe as before.

The wave shape monitor 30 can be a hardware or a software system. The threshold, i.e. the predetermined level of quality, is preferably capable of being reset or otherwise under the control of the authority operating the card reader.

It will be understood that the rewriting of the data on the card is only possible if the data is initially readable, but damaged so that it falls below a required quality. If the data is so badly damaged that it cannot be read by the magnetic head, then no rewriting occurs. In the operation of the invention, it is always initially-present data which is rewritten, there is no facility to modify or update the data.

FIG. 3 shows an ATM 40 having a magnetic card input slot 42, a display screen 44, a keypad 46, and a cash delivery slot 48.

Figure 4:
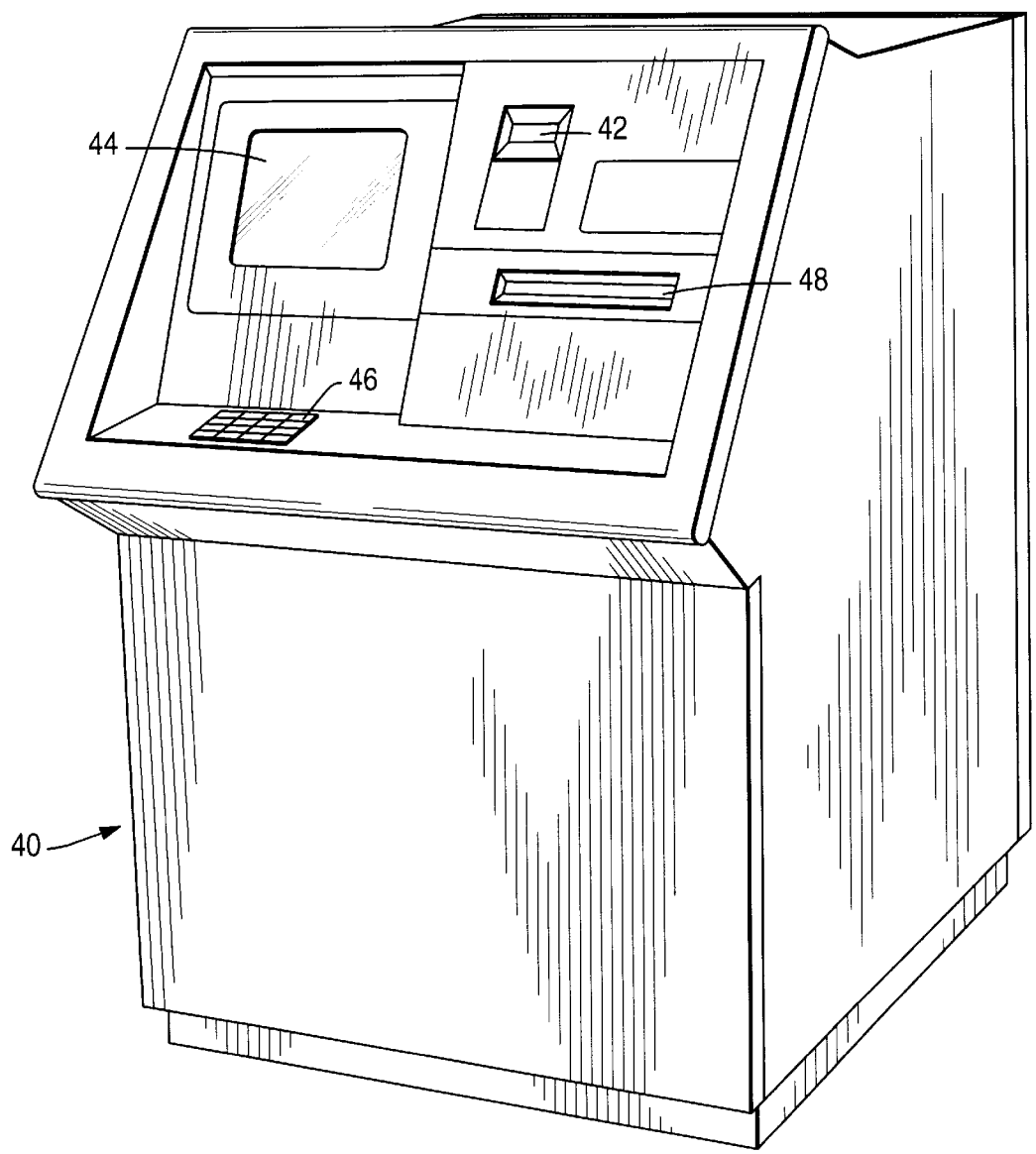
FIG. 4, which illustrates an ATM incorporating a card reader according to the invention.
Figure 5:
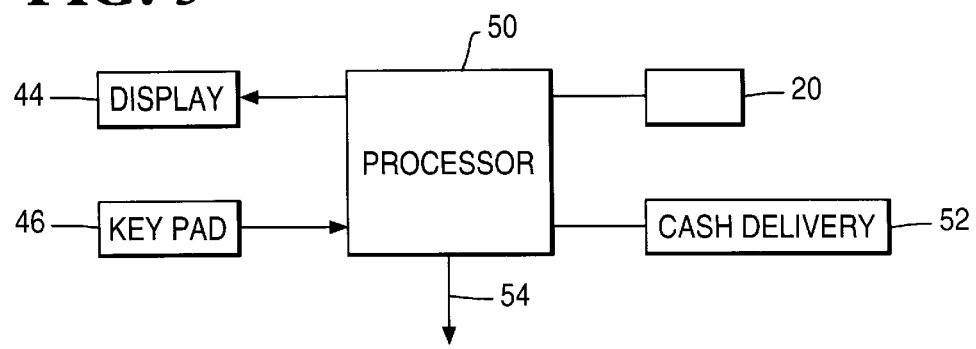
FIG. 5, which illustrates a control system for the ATM of FIG. 3.

The control system for the ATM 44 is shown in FIG. 4, in which a processor 50 is connected to receive input from the keypad 46, to control the display 44, and to control a cash counting and delivery system 52 connected to the cash delivery slot 48. A card reader 20 according to the inventions also connected to the processor 50. The processor is connected by a connection 54 to the central authorization system of the financial institution operating the ATM 40.

If a cardholder inserts into the slot 42 a card which contains readable but damaged magnetic data, the card reader according to the invention operates as described above to rewrite the data on the card while the ATM transaction is in operation.

A card reader according to the invention can be incorporated in other types of self-service financial transaction terminal for which card authorization is required, for example a balance-inquiry terminal.

A card reader according to the invention can rewrite damaged magnetic data with sufficient accuracy and amplitude to meet current international standards, so that cards damaged by accidental exposure to a magnetic influence, but still readable, need not be replaced.

What is claimed is:

1. A magnetic card reader comprising:
   magnetic reading means for reading magnetic data from a card having magnetic data stored thereon;
   magnetic writing means for rewriting readable magnetic data to the card;
   quality monitoring means for monitoring quality of magnetic data read by the magnetic reading means and providing a quality signal indicative thereof; and
   control means for controlling the magnetic writing means to rewrite to the card magnetic data which was previously read from the card, based upon the quality signal from the quality monitoring means.

2. A magnetic card reader according to claim 1, wherein the quality monitoring means includes means for providing an electrical analog signal which represents magnetic data from the card.

3. A magnetic card reader according to claim 2, wherein the quality monitoring means includes a wave shape monitor for receiving the electrical analog signal and producing the quality signal based upon the electrical analog signal.

4. A magnetic card reader according to claim 1, wherein the magnetic writing means and the magnetic reading means comprise a single magnetic device.

5. A magnetic card reader comprising:
   a first magnetic head for reading magnetic data from a card having magnetic data stored thereon;
   a second magnetic head for rewriting readable magnetic data to the card;
   a quality monitoring unit for monitoring quality of magnetic data read by the first magnetic head and providing a quality signal indicative thereof; and
   a controller for controlling the second magnetic head to rewrite to the card data which was previously read from the card, based upon the quality signal from the quality monitoring unit.

6. A magnetic card reader according to claim 5, wherein the quality monitoring unit includes a device for providing an electrical analog signal which represents magnetic data from the card.

7. A magnetic card reader according to claim 6, wherein the quality monitoring unit includes a wave shape monitor for receiving the electrical analog signal and producing the quality signal based upon the electrical analog signal.

8. A magnetic card reader according to claim 5, wherein the first and second magnetic heads comprise a single magnetic device.

9. A self-service terminal for enabling a customer to carry out a financial transaction, the self-service terminal comprising:
   a card reader having an entry slot through which the customer can insert a card having magnetic data stored thereon, the card reader including
   (i) a first magnetic head for reading magnetic data from the card,
   (ii) a second magnetic head for rewriting readable magnetic data to the card, and
   (iii) a monitoring unit for monitoring quality of magnetic data read by the first magnetic head and providing a signal indicative thereof; and
   a control unit for controlling the second magnetic head to rewrite to the card data previously read from the card, based upon the signal indicative of quality of magnetic data read by the first magnetic head while the customer is carrying out the financial transaction.

10. A self-service terminal according to claim 9, wherein the monitoring unit includes a device for providing an electrical analog signal which represents magnetic data from the card.

11. A self-service terminal according to claim 10, wherein the monitoring unit includes a wave shape monitor for receiving the electrical analog signal and producing the quality signal based upon the electrical analog signal.

12. A self-service terminal according to claim 9, wherein the first and second magnetic heads comprise a single magnetic device.

13. A method of operating a self-service terminal, the method comprising the steps of:
   (a) receiving a card having magnetic data stored thereon from a customer;
   (b) reading magnetic data from the card;
   (c) determining quality of the magnetic data read in step (b);
   (d) generating a signal indicative of quality of magnetic data as determined in step (c); and
   (e) rewriting to the card magnetic data which was previously read from the card, based upon the signal generated in step (d) which is indicative of quality of magnetic data read from the card.

14. A magnetic card reader comprising:
   means for accepting a card having magnetic data stored thereon;
   magnetic reading means for reading magnetic data from the card;
   monitoring means for monitoring quality of the magnetic data read by the magnetic reading means; and
   magnetic writing means for rewriting readable magnetic data which is below a predetermined quality;
   wave shaping means for providing an electrical analog signal related to the magnetic data stored on the card;
   the monitoring means including wave shape monitoring means for monitoring quality of the analog signal; and
   the wave shape monitoring means (i) comparing the amplitude level of the electrical analog signal with a predetermined amplitude level, and (ii) causing the magnetic writing means to rewrite the magnetic data if the amplitude level of the analog signal falls below the predetermined amplitude level.

15. A magnetic card reader comprising:
   a mechanism for accepting a card having magnetic data stored thereon;
   a first magnetic head for reading magnetic data from the card;
   a monitoring unit for monitoring quality of the magnetic data read by the first magnetic head;
   a second magnetic head for rewriting readable magnetic data which is below a predetermined quality;
   a wave shaping device for providing an electrical analog signal related to the magnetic data stored on the card;
   the monitoring unit including a wave shape monitor for monitoring quality of the electrical analog signal; and
   the wave shape monitor (i) comparing the amplitude level of the electrical analog signal with a predetermined amplitude level, and (ii) causing the second magnetic head to rewrite magnetic data if the amplitude level of the electrical analog signal falls below the predetermined amplitude level.

16. A self-service terminal for enabling a customer to carry out a financial transaction, the self-service terminal comprising:

a card reader having an entry slot through which the customer can insert a card having magnetic data stored thereon, the card reader including (i) a first magnetic head for reading magnetic data from the card, (ii) a monitoring unit for monitoring quality of the magnetic data read by the magnetic reading head, and (iii) a second magnetic head for rewriting readable data which is below a predetermined quality;

a control unit for controlling the second magnetic head to rewrite readable data while the customer is carrying out the financial transaction;

a wave shaping device for providing an electrical analog signal related to the magnetic data stored on the card; and the monitoring unit including a wave shape monitor for monitoring quality of the electrical analog signal.

17. A self-service terminal according to claim 16, wherein the wave shape monitor (i) compares the amplitude level of the electrical analog signal with a predetermined amplitude level, and (ii) causes the second magnetic head to rewrite magnetic data if the amplitude level of the electrical analog signal falls below the predetermined amplitude level.

18. A method of operating a self-service terminal, the method comprising the steps of:

(a) receiving a card having magnetic data stored thereon from a customer;

(b) reading magnetic data from the card;

(c) generating an electrical analog signal related to magnetic data stored on the card;

(d) comparing the amplitude level of the electrical analog signal with a predetermined amplitude level to determine quality of the electrical analog signal to determine quality of magnetic data; and (e) rewriting the magnetic data if the amplitude level of the electrical analog signal falls below the predetermined amplitude level which is indicative of magnetic data being below a predetermined quality.

19. A system, comprising:

a) means for deriving a signal from a magnetic stripe on a card; and b) means for comparing the signal with a threshold and, if the signal falls below the threshold, i) reading data from the card, and ii) rewriting said data onto the card.

20. Apparatus according to claim 19, wherein the threshold is capable of being reset.

* * * * *